US012597423B2

(12) United States Patent
Suskind et al.

(10) Patent No.: US 12,597,423 B2
(45) Date of Patent: Apr. 7, 2026

(54) ANALYSIS OF CONVERSATIONAL ATTRIBUTES WITH REAL TIME FEEDBACK

(71) Applicant: The University of Chicago, Chicago, IL (US)

(72) Inventors: Dana Suskind, Chicago, IL (US); Arnoldo Muller-Molina, Naperville, IL (US); Snigdha Gupta, Mcdonald, PA (US); John List, Chicago, IL (US)

(73) Assignee: The University of Chicago, Chicago, IL (US)

( * ) Notice: Subject to any disclaimer, the term of this patent is extended or adjusted under 35 U.S.C. 154(b) by 459 days.

(21) Appl. No.: 17/850,454

(22) Filed: Jun. 27, 2022

(65) Prior Publication Data

US 2023/0419961 A1     Dec. 28, 2023

(51) Int. Cl.
| | |
|---|---|
| *G10L 15/22* | (2006.01) |
| *G10L 15/02* | (2006.01) |
| *G10L 15/16* | (2006.01) |
| *G10L 25/24* | (2013.01) |
| *G10L 25/45* | (2013.01) |
| *G10L 17/02* | (2013.01) |
| *G10L 17/26* | (2013.01) |

(52) U.S. Cl.
CPC .............. *G10L 15/22* (2013.01); *G10L 15/02* (2013.01); *G10L 15/16* (2013.01); *G10L 25/24* (2013.01); *G10L 25/45* (2013.01); *G10L 2015/225* (2013.01); *G10L 17/02* (2013.01); *G10L 17/26* (2013.01)

(58) Field of Classification Search
CPC ......... G10L 17/02; G10L 17/26; G10L 25/63; G10L 25/66
See application file for complete search history.

(56) References Cited

U.S. PATENT DOCUMENTS

| | | | |
|---|---|---|---|
| 9,548,046 B1 | 1/2017 | Boggiano et al. |
| 9,799,348 B2 | 10/2017 | Paul et al. |
| 10,134,424 B2 | 11/2018 | Lacson et al. |
| 10,789,939 B2 | 9/2020 | Lacson et al. |

(Continued)

FOREIGN PATENT DOCUMENTS

KR          102225308 B1 *  3/2021  ........... G06N 3/0464

OTHER PUBLICATIONS

International Search Report and Written Opinion for International Application No. PCT/US23/26278 dated Sep. 29, 2023.

*Primary Examiner* — Feng-Tzer Tzeng
(74) *Attorney, Agent, or Firm* — Foley Hoag LLP; Erik A. Huestis; Lee Chedister

(57) ABSTRACT

Devices and methods for providing real-time feedback of conversational attributes are provided. An audio signal comprising speech is received. The audio signal is divided into a plurality of sequential windows. A plurality of features is extracted from each sequential window of the audio signal. Each plurality of features is sequentially provided to a trained classifier and a speech attribute of the corresponding window of the audio signal is received therefrom. After receiving each speech attribute, and based upon that speech attribute and speech attributes of prior windows, a conversational attribute is generated. A user-perceivable output indicative of the conversational attribute is provided.

16 Claims, 7 Drawing Sheets

(56)                    References Cited

U.S. PATENT DOCUMENTS

| | | | |
|---|---|---|---|
| 10,959,648 B2 | 3/2021 | Lacson et al. | |
| 2003/0236663 A1* | 12/2003 | Dimitrova | G10L 17/00 |
| | | | 704/E15.005 |
| 2015/0006168 A1 | 1/2015 | Mysore et al. | |
| 2016/0042734 A1 | 2/2016 | Cetinturk | |
| 2016/0203832 A1* | 7/2016 | Paul | G10L 25/63 |
| | | | 704/238 |
| 2017/0061978 A1 | 3/2017 | Wang et al. | |
| 2018/0301158 A1 | 10/2018 | Zou et al. | |
| 2019/0267027 A1 | 8/2019 | Boggiano et al. | |
| 2021/0254800 A1* | 8/2021 | Bertken | H05B 47/11 |

* cited by examiner

600

601 Receive audio signal

602 Divide audio signal into windows

603 Extract features

604 Provide features to trained classifier

605 Generate conversation attribute

606 Provide output to user

ANALYSIS OF CONVERSATIONAL ATTRIBUTES WITH REAL TIME FEEDBACK

BACKGROUND

The first thousand days of life are a critical time for early brain development. Early experiences, transmitted via rich language and responsive interactions with a nurturing caregiver, fuel the development of neuronal connections at a rate of 1 million per second. This rate of brain growth, which is linked to skill formation in language, literacy, math, spatial reasoning, and self-regulation, is never to be matched later in life. The more input a child receives, the stronger the neuronal connections grow, building a solid foundation for all future learning. Conversely, in the absence of such interactions, the vast neuroplasticity of the developing brain remains underused, and learning and intellectual growth are severely curtailed.

Research shows that as early as nine months, infants born into poverty score lower on cognitive development measures than their more affluent peers. This disparity triples by age two and grows significantly through a child's early years, bringing a cascade of negative consequences that extend into lifelong health and social well-being. By age 5, less than half of children growing up in low-income families are ready for school compared with 75% of children raised in higher income families.

Recent neuroimaging studies have added significantly to this body of research. For example, a recent study at MIT using brain imaging found children who had been exposed to more "conversational turns" (i.e., back and forth interactions between caregiving adults and children) had more activation in the Broca's area of the brain, an area highly involved in speech production and language processing. Further, the researchers found that the extent of activity in the Broca's area predicted children's scores on language assessments. Importantly, this research reveals that after controlling for socioeconomic status (SES), the quantity and quality of input from a parent or other adult caregiver is the key driver of language outcomes.

Despite research that shows the long-term positive impacts of early language exposure on the developing brain, few tools exist that can reliably and accurately measure the quantity and quality of children's early language interactions. There is a particular dearth of tools that are technology-based, scalable, and easy to use. Further, there is a lack of actionable data in the early childhood landscape to guide parents, caregivers, community leaders, and policy makers in how to track and measure the quality of interactions children experience in early care and education settings and ultimately optimize the healthy brain development of children.

Embodiments of the present disclosure relate to real time measurement of conversation turns, and more generally, to analysis of conversational attributes with real time feedback.

BRIEF SUMMARY

According to embodiments of the present disclosure, methods of and computer program products for providing real-time feedback of conversational attributes are provided. An audio signal comprising speech is received. The audio signal is divided into a plurality of sequential windows. A plurality of features is extracted from each sequential window of the audio signal. Each plurality of features is sequentially provided to a trained classifier and a speech attribute of the corresponding window of the audio signal is received therefrom. After receiving each speech attribute, and based upon that speech attribute and speech attributes of prior windows, a conversational attribute is generated. A user-perceivable output indicative of the conversational attribute is provided.

In various embodiments, each sequential window is about one second in length.

In various embodiments, each plurality of features comprise Mel-Frequency Cepstral Coefficients (MFCCs).

In various embodiments, one or more environmental attributes is determined during each of the plurality of sequential windows. The one or more environmental attributes is provided to the trained classifier with the plurality of features of the corresponding window. In some embodiments, the environmental attributes comprise one or more of: temperature, positions, audio volume, vibration, and light level.

In various embodiments, the trained classifier is a convolutional neural network. In some embodiments, each plurality of features comprise Mel-Frequency Cepstral Coefficients (MFCCs) and providing each of the plurality of features to the trained classifier comprises generating an image of the MFCCs.

In various embodiments, the trained classifier comprises discriminant analysis, a SVM, k-nearest neighbors, or a random forest.

In various embodiments, the speech attribute comprises a speaker type. In some embodiments, the speaker type is selected from: female, child, male, and non-human.

In various embodiments, the speech attribute comprises tone.

In various embodiments, the speech attribute comprises parentese.

In various embodiments, the user-perceivable output comprises a light, sounds, or vibration.

In various embodiments, the conversational attribute comprises conversational turn count (CTC). In some embodiments, providing the user-perceivable output comprises illuminating one of a plurality of lights according to whether the CTC exceeds a predetermined threshold. In some embodiments, generating the conversational attribute comprises identifying child speech in one of the plurality of sequential windows and searching a predetermined number of prior windows for adult speech.

In various embodiments, the convolutional neural network includes exactly one convolutional layer.

In various embodiments, the convolutional neural network is quantized.

According to embodiments of the present disclosure, devices for providing real-time feedback of conversational attributes are provided. In various embodiments, the device comprises a computing node configured to perform any of the preceding methods; a microphone configured to produce the audio signal; and a light, a speaker, or a vibration motor configured to produce the user-perceivable output.

DETAILED DESCRIPTION

Figure 1:
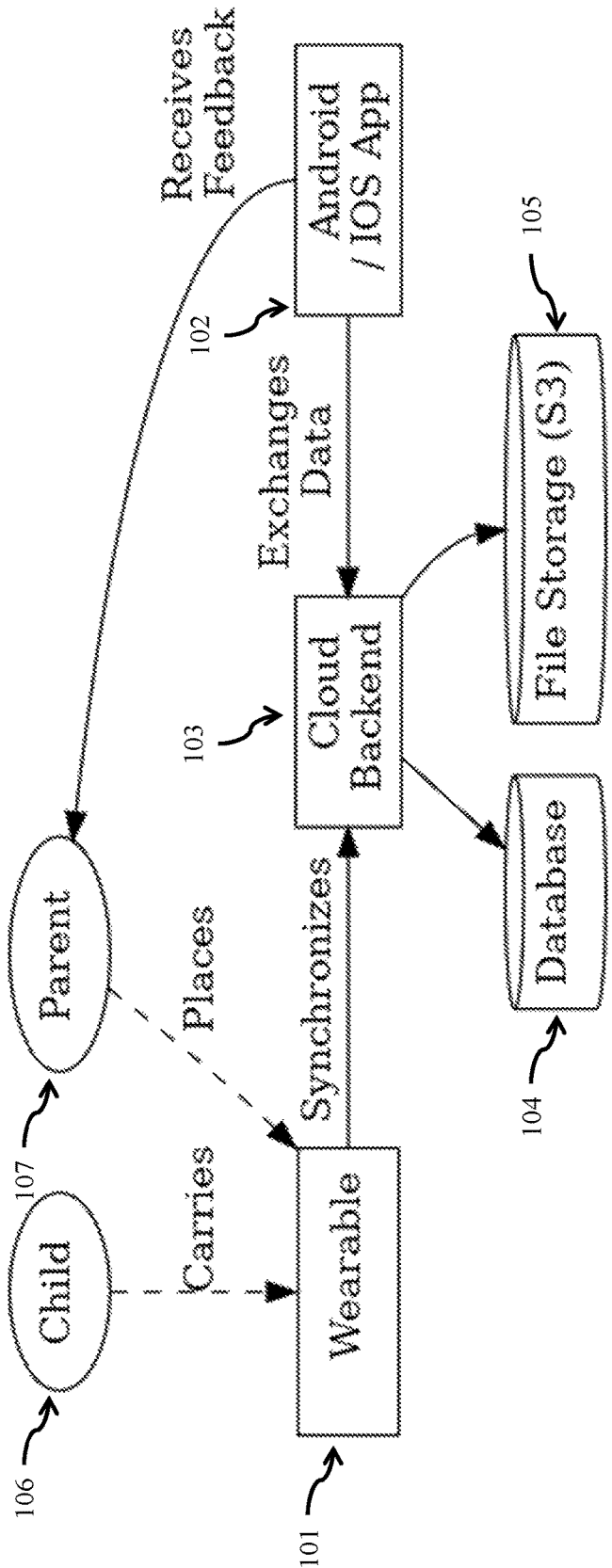
FIG. 1 is a schematic view of a system according to embodiments of the present disclosure.

In various embodiments, the present disclosure provides a small device, the size of a pacifier, that can be worn by a child or adult. The device uses sensors and Artificial Intelligence to capture information about a child's audio environments. It measures conversational turn counts (CTCs), i.e., back and forth interactions between caregiving adults and children. Evidence shows that positive, nurturing interactions are critical to children's development of language, executive function, and socio-emotional skills. Measuring conversational turns allows the device to provide a proxy measure of children's early brain development.

In various embodiments, the sensor device is accompanied by a smartphone or other mobile device app that shares information directly with a user such as a parent. It will be appreciated that the app may also run on another general purpose computing device, various examples of which are provided herein. In addition, the app provides connectivity to a robust backend platform that supports large-scale data collection, analysis, and integration. As set out below, systems according to the present disclosure are designed with user-privacy as a central tenet and have built-in measures to protect child and family identity and privacy.

In various embodiments, a trained classifier is resident on the sensor device. The trained classifier is trained to identify different speaker classes (e.g., child/male/female) in a given audio segment to enable the counting of conversational turns between speakers. These conversational turn counts can then be provided to users. In an example embodiment, the trained classifier is a small convolutional neural network that is capable of processing 1 second of audio in 60 milliseconds of CPU time.

To enable training of the classifier, the present disclosure also provides a weak supervision pipeline for audio labeling of source data.

Devices according to the present disclosure are able to provide real-time CTC calculation without recording audio. Instant feedback is provided by the device, for example through LED lights, vibrations, chimes, or other output. In addition, instant feedback is provided via an app.

Exemplary systems described herein efficiently quantify two key linguistic metrics. A first algorithm focuses on accurately counting conversational turn counts (CTC) in audio recordings. CTCs are conversational "serve and returns" between participants in a conversation. As discussed herein, CTCs between young children and caregivers are an important metric. CTCs serve to measure caregiver responsiveness and can provide valuable insights on the quality of young children's conversational environments. A second algorithm identifies and categorizes the intonation used by caregivers with young children, or other conversation partners. Parental intonation, also known as "parentese" or "motherese," has been used as a proxy for parental sensitivity and has been noted to be positively correlated to language development. It will be appreciated that additional linguistic metrics may be measured using the systems described herein. For example, tone and/or stressed intonation may be measured. In addition, environmental sounds such as electronic, forest, city, ocean, river, or musical noises may be detected.

Devices provided herein enable each parent and caregiver to track how much enrichment a child's brain is getting. They will be able to take active steps to enhance the quality of their interactions and foster healthy brain development for their child during the crucial early years. At a population-level, this will fuel the development of a unique, unprecedented large dataset that can be leveraged by researchers, practitioners, and policymakers alike to draw insights on the best ways to optimize young children's brain development, strategies to support parents and caregivers, and to identify interventions with the largest return on investment.

The present disclosure addresses a critical gap in early childhood— the lack of actionable data and in some circumstances a lack of human connection. Devices provided herein provide the opportunity for a population-level shift in parental and caregiver behavior as it relates to adult-child interactions, while creating a large dataset that can provide insights on adult-child interactions, uncover new lines of inquiry, and advance our understanding of factors that foster brain development in children.

In particular, devices provided herein: act as a proxy measure of children's early brain development; act as a screening tool to identify children who are not experiencing rich language interactions and help prevent early language disparities at their onset; promote early language interactions by providing parents and caregivers a tool to track and enhance the quality of their interactions; provide data that can enable researchers, practitioners, and policymakers to deliver personalized interventions to families and target resources towards at-risk populations; enable interdisciplinary research and collaboration through the use of a robust audio labeling and analysis platform; provide a measure of quality for early childhood programs; and advance the brain science and literature on role of environments on children's cognitive, executive function, and socio-emotional development. Devices described herein may be used in one-on-one conversation, or in group settings such as daycare.

Exemplary wearable devices provided herein are designed to be worn or carried by children from birth up to five years of age during waking hours (although it will be noted that additional use cases are described and enabled by the present disclosure). This enables collection of data on children's language interactions with caregiving adults, their broader auditory environment, and secondary information such as physical activity and proximity. These data can be analyzed to provide crucial information on the quantity and quality of children's language interactions by counting conversational turns between caregiving adults and children and characterizing the tone of those interactions (e.g., positive/negative). Additionally, these data can be used to better understand the bi-directional relationship between children's environments and brain development. For example, these data may be used to better understand how different elements of children's broader environment such as environmental stress (measured through background noise) impact their brain development and executive functioning skills. Similarly, other elements of a child's environment (such as music) that have a positive impact on the developing brain may be analyzed, ultimately allowing the recommendation of environments that can optimize children's brain development, socio-emotional, and executive functioning skills.

As set out below, device according to the present disclosure use cutting-edge artificial neural networks to draw an ontology of a child's auditory environment. In various embodiments, a backend is provided to store and synchronize data. When used in conjunction with other data collection methods such as a brain imaging technology, devices according to the present disclosure provide unprecedented data and insights on mechanisms that strengthen brain activity in regions responsible for language, socio-emotional, and executive function development in the brain.

It will be appreciated that devices according to the present disclosure have a variety of use cases.

Devices provided herein may be used by researchers as an outcome measure to assess the impact of their interventions or as a feedback tool to promote adult linguistic behavior change. For example, they may be used in connection with a suite of interventions to both provide participants a behavior change strategy as well as a measurement tool to study the impact of the intervention on adult behavior change and consequently on child outcomes such as vocabulary or executive functioning skills. In addition to this, it may be used by neuroscience researchers to study the relationship between young children's environments, brain processing, and their well-being.

Similarly, devices provided herein may be used by early childhood programs to measure quality of the language interactions between adults and children and promote positive adult-child interactions during the first five years. The early childhood landscape lacks measurement tools that are technology-based, scalable, and easy to use. Devised provided herein provide a powerful measure of adult-child interactions in childcare settings, both at home and in daycare. It may be used by a variety of public and private early childhood care and education settings to generate quantitative feedback and support professional development to promote early language interactions.

Devices provided herein may also be used as a screening tool by healthcare providers to identify children who don't have consistent access to rich language interactions and prompt them to discuss the importance of early language exposure with families, and thus help prevent early language disparities. In its Agenda for Children, the American Academy of Pediatrics identifies pediatricians as playing a pivotal role in advancing evidence-based strategies that promote adult-child interactions and reduce toxic stress. Pediatricians have frequent interactions with families during a child's early years and they are well-positioned to leverage their relationships with families to equip caregivers with knowledge of early cognitive development and encourage them to engage in rich, responsive back and forth interactions with their children to foster healthy brain development. Similarly, maternity wards and birthing hospitals are uniquely positioned to educate families about the importance of language interactions and how caregivers can influence their child's brain development. Devices provided here may be used by birthing hospitals and pediatricians as a tool to encourage families to leverage the power of their words, track how they are doing, and provide them necessary support and guidance to prevent enduring disparities early.

Additionally, devices provided herein may be used for the elderly (for example in old age homes), in connection with various mental health therapies, in connection with counseling, or for other care scenarios. The outer case of such devices may be varied in accordance with the use case, e.g., adopting the form factor of a smart phone or external battery for adult-use cases.

With reference now to FIG. 1, an exemplary system according to the present disclosure is illustrated. System 100 includes wearable device 101. Wearable device 101 is worn by a child; its main purpose is to record and process audio and provide feedback. In various embodiments, the device provides at least 10, or at least 24 hours of battery life. In some embodiments, the device enters reduced power mode periodically (e.g., every 100 millisecond) in order to maximize battery life. App 102 facilitates Bluetooth-driven setup for wearable device 101, and also provides timely feedback and other kinds of content to the user, e.g., learning resources. It will be appreciated that app 102 may run on a variety of platforms known in the art, including Android and iOS.

Cloud backend 103 receives data from wearable 101, for example by periodic synchronization, and exchanges data with app 102, for example to provide real time alerts. In some embodiments, cloud backend 103 exports a RESTful API. Cloud backend 103 stores data that can be used to drive new research insights. In some embodiments, data are stored in a relational database 104, with denormalized views that can be extracted on demand to generate reports. In some embodiments, audio files and other metadata are stored in in data science-friendly formats such as Parquet, Json, or CSV formats in file storage 105.

Wearable device 101 is carried by child 106, and detects the voices of both child 106 and adult 107 (e.g., a parent or caregiver). As noted above, wearable device 101 is designed to be low-power, child-safe, and privacy-preserving. In some embodiments, device 101 pairs via Bluetooth Low Energy (BLE) with a base station or mobile device for data transfer. In some embodiments, device 101 has a Wi-Fi adapter or other wireless network adapter that activates while the device is charging in order to minimize power usage. The Wi-Fi adapter or other wireless network adapter is used for periodic data transfer to cloud backend 103.

In various embodiments, wearable device 101 conforms with IEC 62368-1 and/or ASTM F963-17 standards and uses non-toxic and non-porous materials. In various embodiments, device 101 is resilient to dropping, biting, and humidity. In various embodiments the device is waterproof or water resistant, for example, such embodiments may conform with IP codes IPX1 through IPX9K. In various embodiments, device 101 is able to continue functioning without an internet connection and without BLE access. Data collected when in offline mode may be synchronized once a network and or BLE connection is again available.

In various embodiments, wearable device 101 may operate in two modes: voice recording mode and real-time mode. In voice recording mode, device 101 will only store audio segments that include human voice. An optional mode will allow full, continuous audio recording. The audio data will be synchronized via Wi-Fi with the cloud backend when the device is charging. This mode of operation will provide additional audio ontologies focused on understanding audio environments (noise chaos, impact of music) but the real-time mode can also provide this as well in the future. Timestamps may be stored with the audio recordings.

In real-time mode, device 101 counts CTCs in real-time. No audio will be recorded, but onset and offset information for each audio category will be encoded. The audio transcription metadata will be synchronized via WIFI when the device is charging. A real-time CTC statistic can be synchronized via BLE to app 102.

In various embodiments, app 102 provides various connectivity and reporting functionality. In some embodiments, app 102 configures wearable device 101 via a pairing Bluetooth operation and updates its settings. During this process, we can provide Wi-Fi or other wireless network access information can be provided to the wearable device 101. In some embodiments, app 102 displays information to the user that is intended to inform the conversational turns achieved using various reporting strategies. In various embodiments, app 102 connects directly to the cloud backend in order to retrieve data for such reporting. In some embodiments, app 102 includes further digital resources, for example containing educational content related to the power of Conversational Turns.

Cloud backend 103 communicates with wearable device 101 (via Wi-Fi) and with the app 102 (via Wi-Fi or a wired network). Cloud backend 103 stores information and statistics (such as CTC information) about each user/device/child combination in database 104. In some embodiments, audio data is stored for training a classifier. In various embodiments, cloud backend 103 provides CTC reporting information and other statistics to app 102.

Database 104 stores caregivers, children, and device information and statistics. This database will be useful for future reporting and for analyzing correlations based on multiple studies. In various embodiments, table views are provided that are amenable to density-focused, metric-learning-compatible clustering algorithms to identify overrepresented patterns in the data.

File storage 105 may be implemented through cloud storage such as S3. As noted above, storage 105 is used to store encrypted audio data and accompanying metadata information in various embodiments.

While cloud backend 103 may be implemented in a variety of ways known in the art, exemplary implementations are hosted on AWS or another cloud provider. include two-factor authentication (e.g., token-based authentication with JWTs). The backend will be hosted on AWS (which in some embodiments complies with FedRAMP, NIST 800-53, and/or NIST 800-171).

Figure 2:
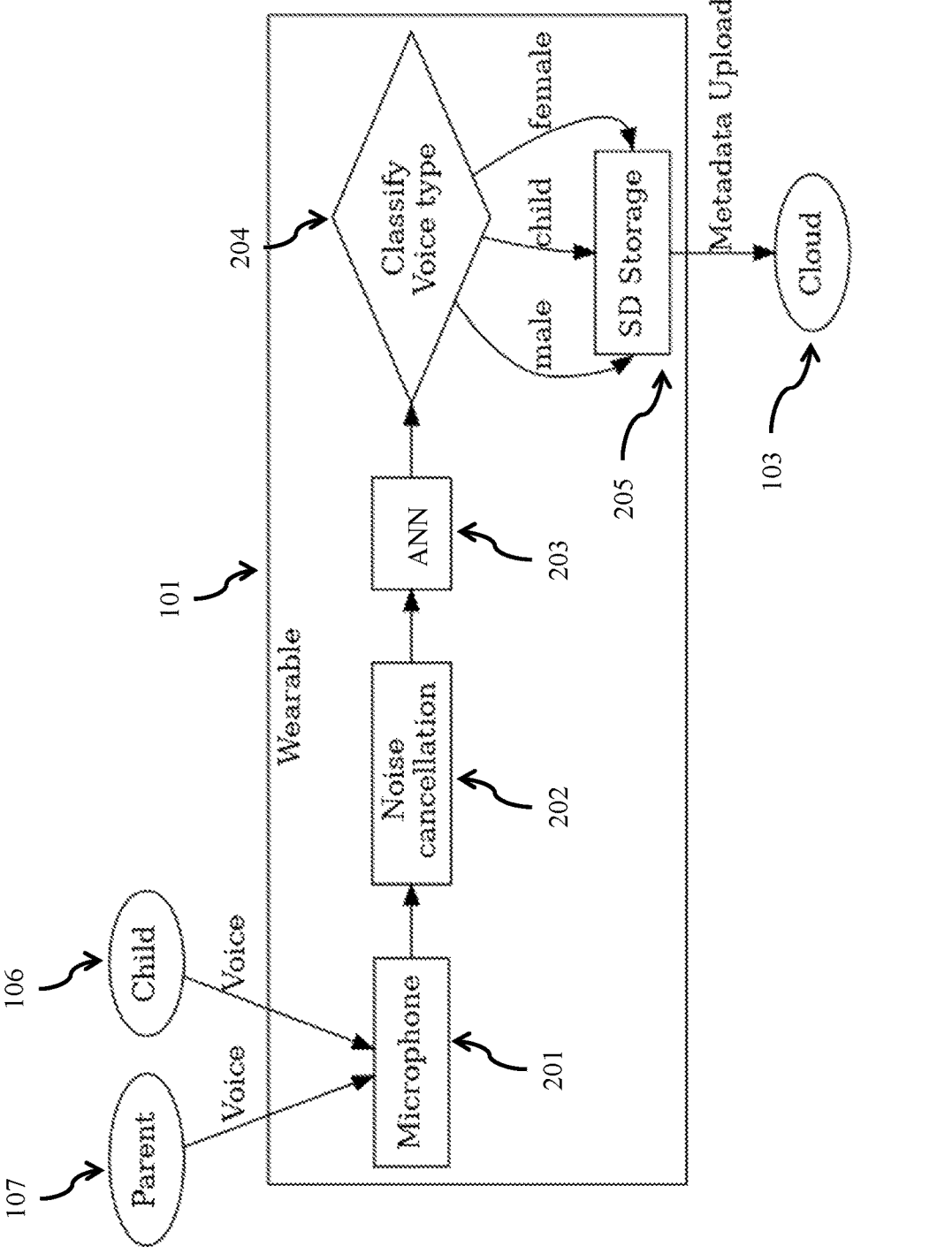
FIG. 2 is a schematic view illustrating a real-time detection first mode of the system of FIG. 1.

As noted above, device 101 supports two modes of operation: real time detection; and full-recording mode. FIG. 2 illustrates real-time detection while FIG. 3 illustrates full-recording mode.

Referring to FIG. 2, wearable device 101 collects voice information from adult 107 and child 106 via microphone 201. In some embodiments, noise cancellation 202 is applied to the audio signal received from microphone 201. Features are extracted from the audio signal, and provided to artificial neural network (ANN) 203, which is trained to classify 204 the voice type between a plurality of categories (male, female, child). Various noise cancellation methods are known in the art, and the ANN may be retrained using data with such noise cancellation applied in order to mitigate any artifacts that are introduced thereby. In some embodiments, the input to ANN 203 comprises an image of MFCC (Mel-frequency cepstral coefficients) features extracted from the audio signal. In some embodiments, ANN 203 is a convolutional neural network (CNN). IN some embodiments, the CNN has a single convolutional layer. In some embodiments, ANN 203 is implemented using a TinyML paradigm, such as TensorFlow Lite. In some such embodiments, as little as 64 kb of memory is required to execute the model. The results of the voice classification is stored to a local storage 205 (e.g., SD storage) on device 101. The classifications and associated timestamps or other metadata are uploaded to cloud 103 as described above.

Figure 3:
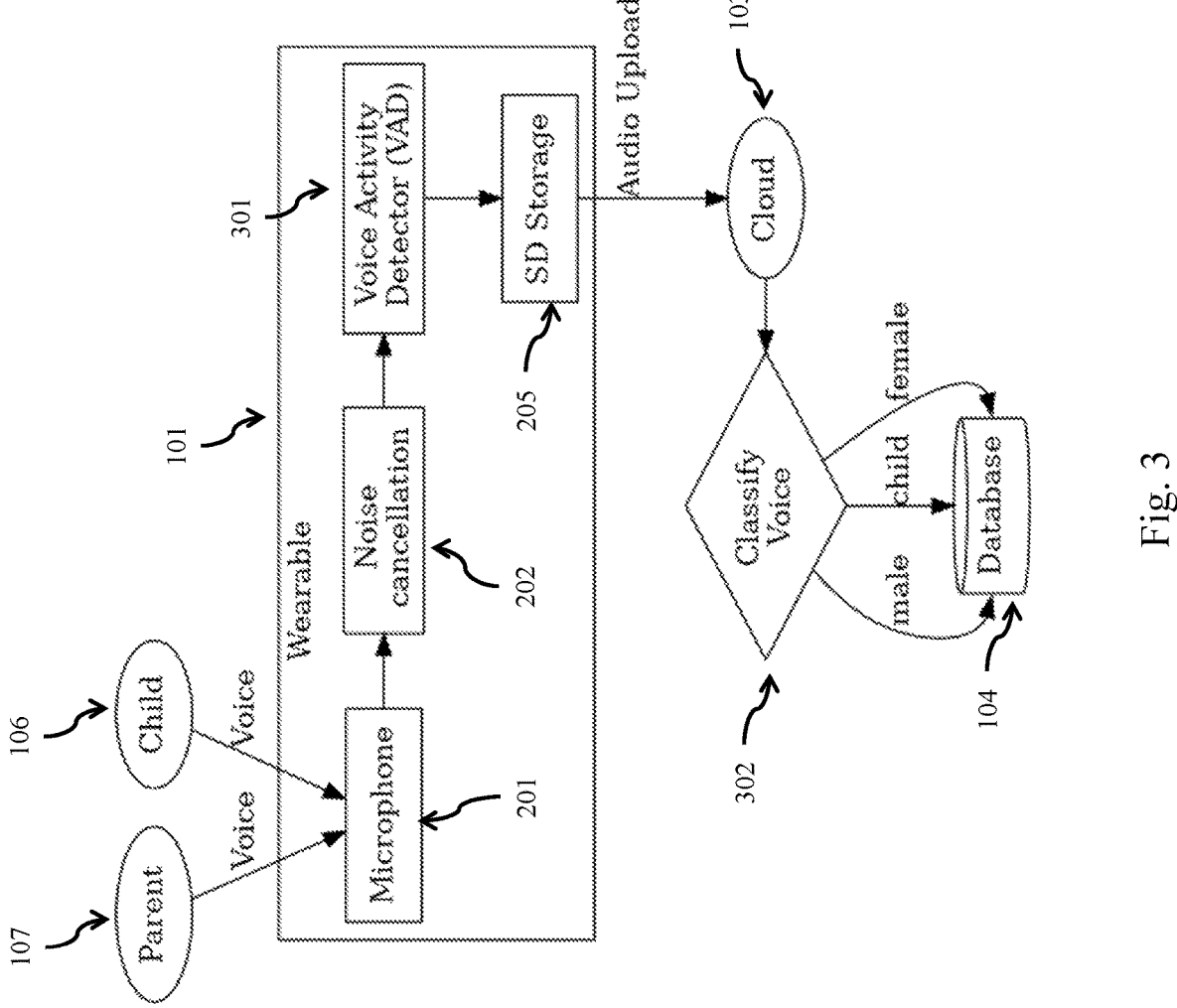
FIG. 3 is a schematic view illustrating a full-recording mode of the system of FIG. 1.

Referring to FIG. 3, wearable device 101 again collects voice information from adult 107 (e.g., a parent or caregiver) and child 106 via microphone 201. In some embodiments, noise cancellation 202 is applied to the audio signal received from microphone 201. Instead of or in addition to processing on device, a voice activity detector 301 is applied to the audio signal to determine when a voice is present (but not to classify the voice). It will be appreciated that a variety of voice activity detection (VAD) algorithms are known in the art, including those provided by G.729, GSM, and Speex. When a voice is detected, a recording of the voice is stored to local storage 205. The voice recordings are uploaded to cloud 103 for further processing.

At the server side, features are extracted from the audio recordings, and provided to a classifier for classification of the voice 302 between a plurality of categories (e.g., male, female, child). In various embodiments the server-side classifier is an ANN, which is trained to classify the voice type. In some embodiments, the input to the classifier comprises an image of MFCC (Mel-frequency cepstral coefficients) features extracted from the audio recording. In some embodiments, the ANN is a convolutional neural network (CNN). In some embodiments, the CNN has a single convolutional layer (potentially multiple layers are possible discretization). The results of the voice classification and associated timestamps or other metadata are stored in database 104. In some embodiments, the output of the ANN is an indication of the classification of speech. In some embodiments, the output of the ANN also includes and onset and offset time of that speech classification.

In the full-recording mode, the device is used to record audio that is uploaded to the cloud. In the cloud, more memory and CPU power are available, and therefore a deep neural network architecture with over 30 layers of convolutions may be used and a wavegramlog-mel architecture. An example of such an architecture is referred to as a PANN (pretrained audio neural network), as described in Kong, et al., PANNs: Large-Scale Pretrained Audio Neural Networks for Audio Pattern Recognition (arXiv:1912.10211). In some embodiments, a lightweight GMM+Stacking Machine Learning Classifier is used. The VAD (Voice Activity Detector) may force an upper bound of the accuracy of the CTC detection. Therefore, in some embodiments all the audio is recorded instead of just audio that has a detected voice.

Data security and privacy is particularly important to balance against the desire for the collection of meaningful data. In the voice recording mode, a device-specific public-key encryption scheme is provided to safely store the audio data encrypted on device. Once the data is uploaded to the cloud, it can be temporarily unencrypted via a private key only for processing purposes leaving all data encrypted at rest. In the real-time mode of operation, CTCs and other metrics will be calculated in real-time. In this mode, onset and offset metadata associated to each event are stored, but no audio will be recorded. Public key cryptography encryption may be optionally enabled on the device in this mode as well.

Figure 4:
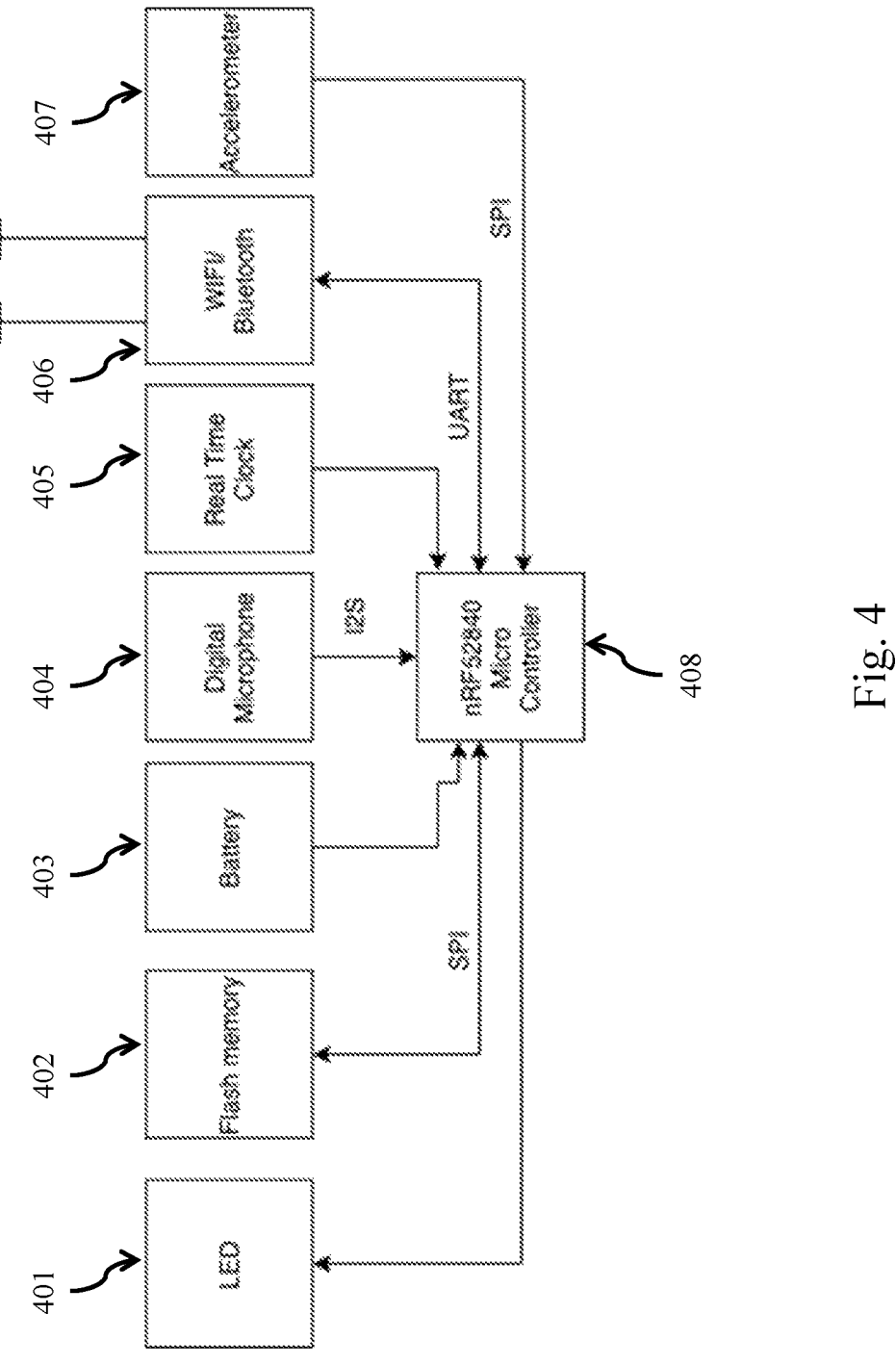
FIG. 4 is a block diagram illustrating the components of a wearable device according to embodiments of the present disclosure.

Referring to FIG. 4, an exemplary physical architecture of device 101 is provided.

Flash memory 402 is a long-life and non-volatile storage chip that is widely used in embedded systems. It can keep stored data and information even when the power is off.

Wi-Fi/Bluetooth subsystem 406 is used to send and receive data as discussed further above. Bluetooth (BLE) is a low-power wireless communication technology that can be used over a short distance to enable smart devices to communicate. As noted above, BLE is used to configure device 101. Wi-Fi is the wireless version of a wired Ethernet network, and it is commonly deployed alongside it. Wi-Fi is used to share stored audio data to the cloud. This connection is generally 20-30 times faster than BLE file transmission. These file transfers are planned when device plugged-in due to power constraints.

Accelerometer 407 is used to detect both the magnitude and the direction of the proper acceleration of device 101 and can be used to sense orientation, coordinate acceleration, vibration, and shock. Accelerometer 407 is used to detect child movement, direction, and/or falls. These data are provided as additional features to the classifier, and/or are retained for further analysis.

Digital microphone 404 is used to receive an audio signal. In some embodiments, microphone 404 includes a built-in analog-to-digital converter (ADC). The ADC takes the analog signal from the mic diaphragm/capsule at its input and converts that signal to digital information. In some embodiments, microphone 404 is used to record child and parent speech audio at a 16000 Hz sampling rate with a 16 bit sample size. However, it will be appreciated that a variety of sampling rates and sample sizes may be employed. For example, while higher sampling rates and sample sizes generally provide higher quality audio, a sampling rate of 8000 Hz is generally accepted as suitable for unambiguous reproduction of speech and so is used in various telecommunications applications and is suitable for use with the presently disclosed methods.

Light-Emitting Diode (LED) 401 is used to provide visual feedback to parents on their conversational turn goals. For example, in some embodiments four LEDs are provided and one is illuminated after a user completes each quarter of their daily conversation turn goal.

Battery 403 is used to power device 101. The battery is selected to be safe for use in children's product, powerful enough to run at least for 24 hours, and small enough to fit within hardware mount. In various embodiments, the battery is UL approved for use with children's devices. In various embodiments, the device includes a temperature sensor for monitoring the battery status. The device will shut down if the temperature exceeds a certain threshold.

Microcontroller 408 is used to execute the ANN on device 101 as well as to run additional code to control a microphone, SD, voice activity detection, Bluetooth transmission encoding and decoding, and other features described herein. It will be appreciated that a microcontroller is special form of computing node that includes components like memory, peripherals, and a processor in a reduced form-factor.

Figure 5:
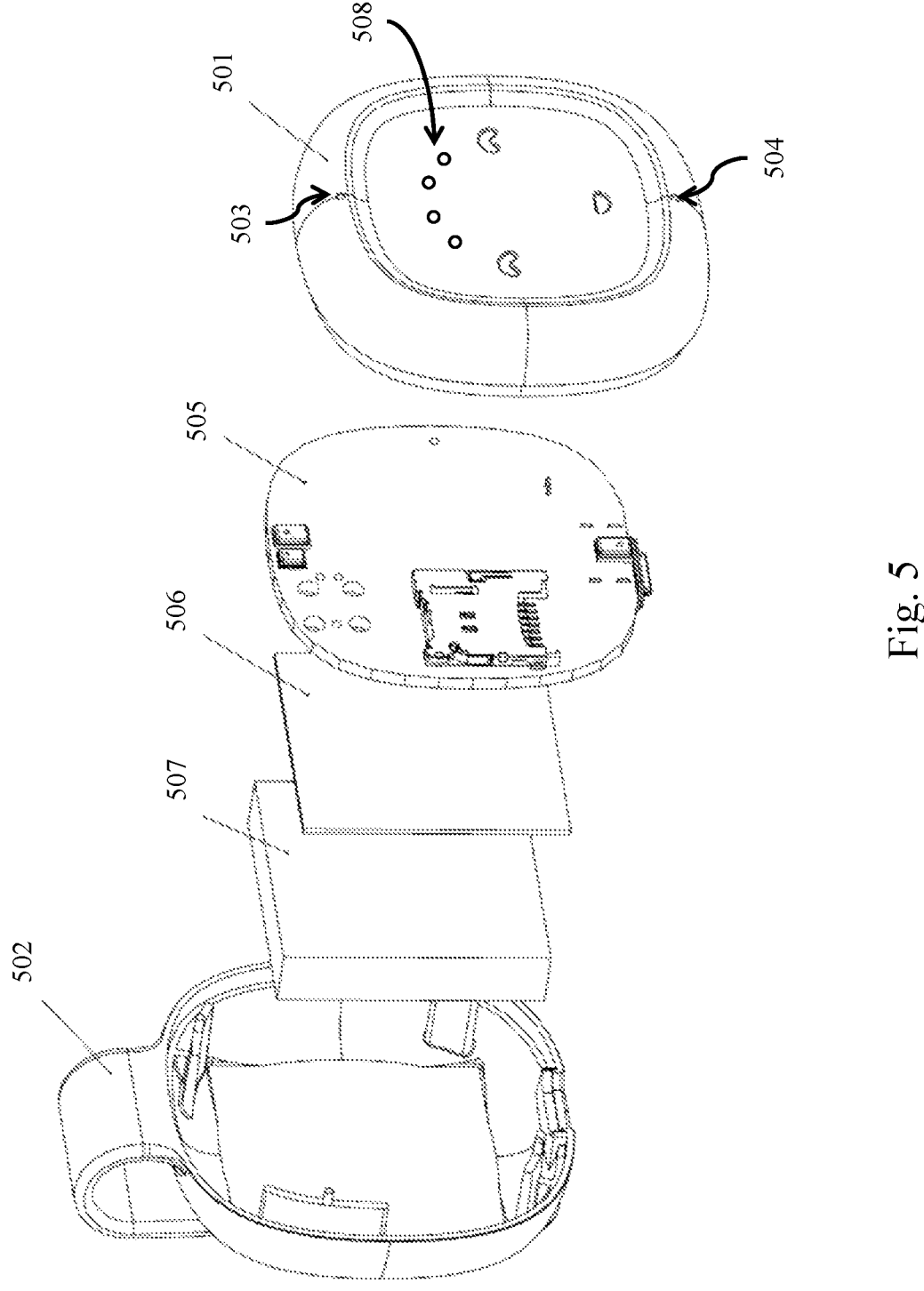
FIG. 5 is an exploded view of a wearable device according to embodiments of the present disclosure.

Referring to FIG. 5, an exemplary form-factor of a wearable device according to the present disclosure is illustrated. Front housing 501 includes a face to resemble a child. The housing has two eyes and a mouth carved in the front, and also five LEDs visible for feedback. Back housing 502 completes the case. A PCB 505, insulating pad 506, and battery 507 are contained in the case.

There are four LEDs 508 on the top of the front face of the device. These will remain "off" for the most part and will light up when the user reaches a certain percentage of their daily conversational turn goal or when the user activates a capacitate button on the face. The fifth LED is part of the mouth carving and is used to share device status—charging, in pairing mode, connected to Bluetooth, etc.

There are two openings 503, 504 for microphones to receive audio signals. They are placed at the top and bottom of the face. In some embodiments, the pair of microphones is used to determine the origin of a given sound, which may be provided as an additional feature to the classifier. In this way, the triangulated distance to a given speaker can be used as an additional identifying feature. In addition, some embodiments include a third microphone that is used as an activity detector to enable waking from a deep sleep mode.

As discussed above, a key linguistic metric is the CTC (conversational turn count). In various embodiments, each second of the audio signal is sent to a classifier for detection of a speaker type (child or adult). In a child-centric counting method, when child speech is detected, the system looks back for five seconds to check for adult speech. If adult speech (e.g., of a caregiver) is detected, then one conversational turn is recorded. Similarly, once child speech is complete, adult speech is checked for in the subsequent five seconds. If adult speech is detected, an additional CTC is counted. As discussed above, the timestamps of each detection may be stored for ongoing analysis. In this way, each new child detection initiates a limited lookback of the detection log to increment that CTC count.

While some embodiments use a one second audio window, it will be appreciated that alternative window lengths are also possible. In general, longer window lengths result in a more complex neural network that may be unsuitable for low-power deployment. Shorter windows reduce accuracy of detection. Accordingly, one second represents a tradeoff. While some embodiments use non-overlapping windows, detecting voice in overlapping windows is also possible. This increases computation requirements, however, and so may be unsuitable for low-power deployments.

In some embodiments, a minimum threshold is imposed on the length of adult speech that contributes to the CTC. For example, in some embodiments, speech by an adult lasting less than 300 milliseconds is disregarded. In such embodiments, the output of the ANN includes onset and offset time of each speech classification in order to allow screening by duration.

As set out above, CTC detection focuses on the detection of female, child, male, and non-human audio categories, and in some embodiments onsets and offsets of each detection are determined. In some embodiments, a multi-task classifier is provided that implements tone detection, music detection, and/or additional classifications.

In various embodiments, acoustic features are extracted from audio that allow identification of parental interactions that result in higher brain development (such as positive tone). A wide range of features in the time and frequency domains are extracted for each frame of audio (e.g., 1 second). Features included number of syllables, number of pauses, rate of speech, and/or fundamental frequency as well as more advanced acoustic features such as Chroma, MFCC, MelSpect, and/or Contrast. In some embodiments, pretrained models such as Pretrained Audio Neural Networks (PANNs) or other neural network models are used to generate additional labels for each frame of audio. During training, pre-labeled audio may be collected from a variety of databases to update these models.

Developmental outcomes for children are also collected. In various embodiments, these include vocabulary scores from the ROWPVT and/or Woodcock-Munoz tests, math scores, and/or executive functioning scores. Using these developmental outcomes and the acoustic features noted above, a model is trained to recognize patterns of interaction that are correlated with higher achievement scores in different set of outcomes. In various embodiments, the model comprises regression analysis via two stage least squares and a Random Forest for children in the treatment and control groups to identify positive (reinforcing) and negative (weakening) behaviours. It will be appreciated that alternative statistical models are applicable in addition to regression analysis. Moreover, it will be appreciated that alternative decision tree models are applicable in addition to random forest.

A longitudinal set of audio files is used in training to enable the model to capture changes in parental interactions in both the treatment and control group. These changes are compared with changes in developmental outcomes in different time periods to establish a causal estimate, or an internally valid estimate of the treatment on various child outcomes. Accordingly, a set of unique positive and negative behaviours are identified.

Since the number of extracted features from each audio is large, in various embodiments the model uses unsupervised learning methods, such as an autoencoder, for dimensionality reduction. This allows compression and combination of related features to select identical features/interactions that are reinforcing, neutral, or weakening. The identified set of optimal parental interactions are compared to a set of counterfactual speaking styles, such as Parentese, that are well studied by researchers for attracting children's attention and hence achieving more enhanced mental developments.

The interaction algorithm described above can be adapted as a set of weak supervision labeling functions (LFs) that use different male, female, and child classifiers such as PANN or TinyML. The weak supervision engine can then use those LFs to create new training data that a TinyML classifier can learn. In this case, the objective function is a multi-task classification problem.

High quality training data are important for training a voice classifier according to the present disclosure. In an exemplary recording configuration, an acoustic chamber setup with Head and Torso Simulator (HATS) is provided, achieving silence <30 dB. This configuration may also be used to expose the device to multiple acoustic environments in order to fine tune the trained classifier.

While there are extensive existing early childhood audio datasets that may be used to train, test, and validate the classifiers set out herein, not all are of sufficient quality for reliable use. In particular, existing datasets that provide transcriptions and onset and offset of expressions exhibit inaccuracies from 100 milliseconds up to several seconds.

To create an accurate training dataset and to be able to quickly ingest additional classification tasks a weak supervision (WS) pipeline is provided. Weak supervision is a data labeling technique where noisy, limited, or imprecise sources are used for labeling large amounts of training data. This approach alleviates the burden of obtaining hand-labeled data sets, which can be costly or impractical. The WS pipeline is combined with existing data labeling practices.

Exemplary data sources include HomeBank. HomeBank has different kinds of data. Some datasets are five minute long audio recordings accompanied by speech onset and offset times, or transcriptions, or both. Others are one hour long videos with no accompanying timestamps or transcripts. Additionally, there are datasets that include one second audio segments that were pulled from one of the above data sources or other audio data. The datasets include human annotated data (transcription, onset offset, speaker identification). To train a classifier, annotation onsets and offsets must match the speaker voice as closely as possible to provide high quality data. One dataset of ten hours may take two months of manual annotation by a reviewer.

Clean and highly accurate data of child and caregiver speech is required to train a classifier. The above datasets are not precise and had significant noise and inaccurate timestamps. Manually labeling audio and videos produces much better results, but it is still necessary to apply several heuristics that adjust the onsets and offsets of the annotations. Various heuristic corrections may be applied to clean input data.

A first heuristic, dealing with false positives, applies a ground truth voice detection algorithm (e.g., Google VAD) and labels portions of input audio where no voice is detected accordingly, thus overriding false-positives in the source data.

A second heuristic, dealing with false negatives, likewise applies a ground truth algorithm to override portions of the audio that were labeled as lacking a speaking. A speaker label for these portions is inferred based on the most proximate of the latest identified speaker.

To further clean speech data, the above two heuristics may be combined with additional corrections. For example, portions of the audio with overlapping voice may be ignored.

As noted above, a Weak Supervision (WS) pipeline may be applied to existing audio files. Weak supervision automatically produces labels by applying labeling functions (LFs) on the data that generate noisy labels. A generalization algorithm is applied to the noisy results that generates high quality labels. Existing frameworks for WS do not support audio files. Accordingly, the present disclosure provides a bidirectional mapping between audio annotations to a tabular data structure suitable for use in existing WS frameworks to perform probability-based selection.

Each audio annotation is transformed into a DataFrame that contains the onset, the length of the onset and a boolean value associated with male, female or child. If all of those annotations are false, it is assumed to be nonhuman. Some embodiments work at the millisecond level, but wider windows may be used. Inside the DataFrame, labelling functions can operate. If new annotations are added, it is possible to convert the DataFrame into a tuple based annotation format that includes an onset, offset, and label stored in a list. Since the DataFrame contains boolean columns, boolean operations can be performed. For example, in some embodiments, a Boolean VAD column and a Boolean child column are provided. A logical AND operation of those columns may be performed to optimize the accuracy of the human annotation.

An exemplary classifier outputs a speaker type of Male, Female, Child, Non-Human. The classifier is trained on a conventional computer, and model integer quantization is implemented to speed up the inference time. Model pruning is applied as well. Quantization reduce the size of the neural network to make sure it can run efficiently on the embedded processer of the mobile device, which performs floating point operations slowly.

Several validation strategies are implemented to make sure that the full model and quantized models are equivalent, and that the audio recorded on device provides the same inputs to the model. The CTC is validated on the original model (before compression) and then the CTC value is calculated on a compressed model. The same process is performed with different audio files recorded by the device at different distances to avoid using auto gain.

Hyperparameters of the model are tuned using existing methods such as Keras. In an exemplary model, binary crossentropy loss is employed. The CTC calculation of ground truth annotations are compared against the predicted CTC and the RMSE (Root Mean Square Error) is estimated. For each speaker the accuracy is calculated at the millisecond level. Each millisecond has an annotation type, and the accuracy per speaker is determined.

As noted above, the CNN may be limited to exactly one convolutional layer in order to minimize processing costs on low power devices. However, increased accuracy may be obtained in some embodiments by deploying multiple convolutional layers provided that the power and processing time budget is met.

In embodiments, updated models may be deployed to the mobile device over the air (OTA). In this way, user-specific, language specific, or location specific models may be deployed.

While various embodiments described above use a convolution neural network, it will be appreciated that alternative classifiers may be used in other embodiments. Suitable classifiers include discriminant analysis, a support vector machines (SVMs), k-nearest neighbors, random forests, and other artificial neural networks (ANNs).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, recurrent neural networks, or a deep Q-network.

Figure 6:
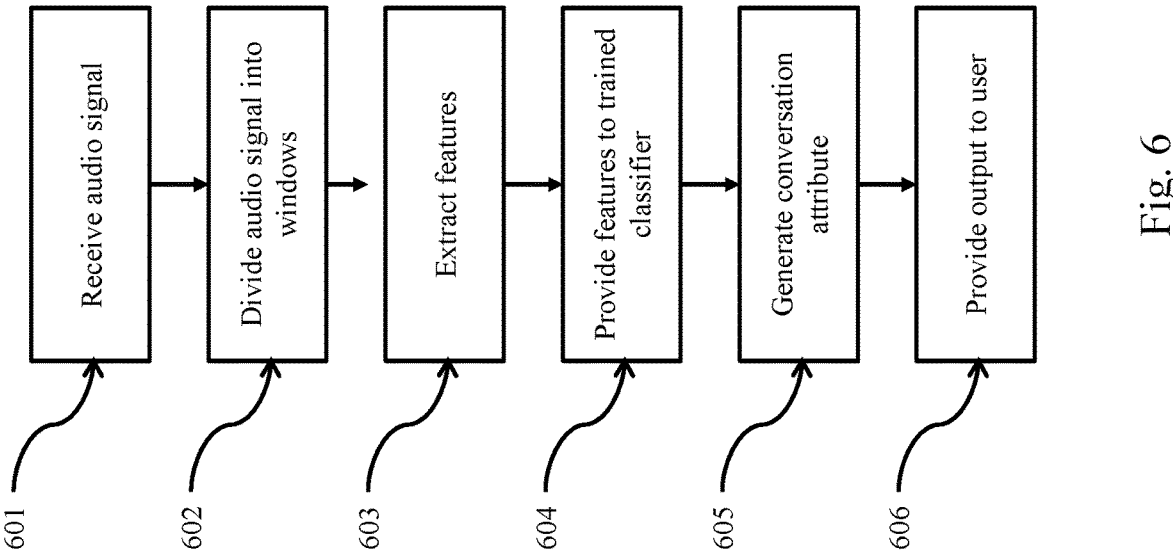
FIG. 6 is a flowchart illustrating a method for providing real-time feedback of conversational attributes according to embodiments of the present disclosure.

Referring now to FIG. 6, a method 600 for providing real-time feedback of conversational attributes is illustrated. At 601, an audio signal comprising speech is received. At 602, the audio signal is divided into a plurality of sequential windows. At 603, a plurality of features is extracted from each sequential window of the audio signal. At 604, each plurality of features is sequentially provided to a trained classifier and a speech attribute of the corresponding window of the audio signal is received therefrom. At 605, after receiving each speech attribute, and based upon that speech attribute and speech attributes of prior windows, a conversational attribute is generated. At 606, a user-perceivable output indicative of the conversational attribute is provided.

Figure 7:
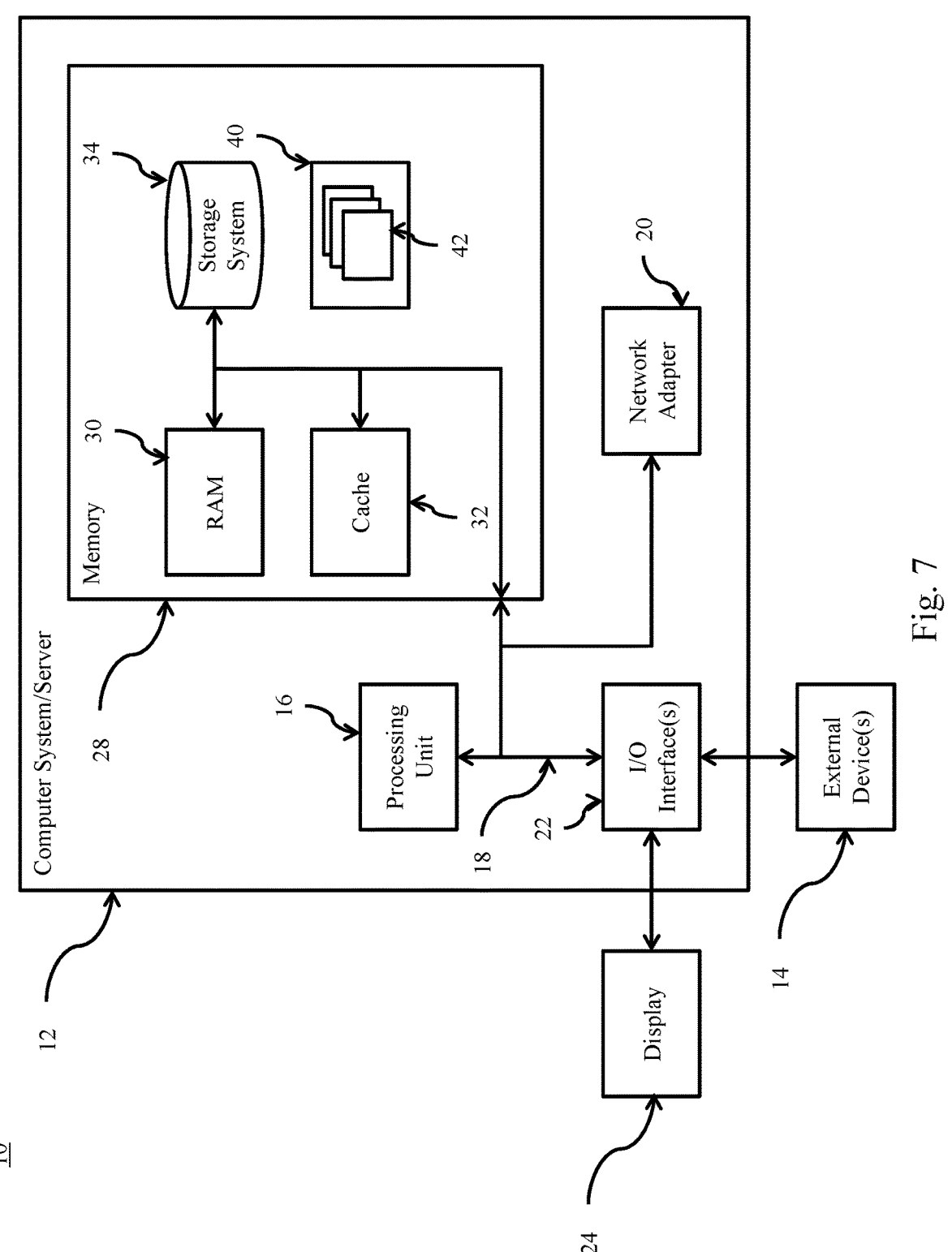
FIG. 7 depicts a computing node according to embodiments of the present disclosure.

Referring now to FIG. 7, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of providing real-time feedback of conversational attributes, the method comprising:
   receiving an audio signal comprising speech;
   dividing the audio signal into a plurality of sequential windows;
   extracting a plurality of features from each sequential window of the audio signal;
   sequentially providing each plurality of features to a trained artificial neural network, in particular a convolutional neural network, and receiving therefrom a speech attribute of the corresponding window of the audio signal, the speech attribute comprising a speaker type;
   after receiving each speech attribute, and based upon that speech attribute and speech attributes of prior windows, generating a conversational attribute, wherein the conversational attribute comprises a conversational turn count (CTC) based on a change in speech attribute among that speech attribute and speech attributes of prior windows; and
   providing a user-perceivable output indicative of the conversational attribute.

2. The method of claim 1, wherein each sequential window is about one second in length.

3. The method of claim 1, wherein each plurality of features comprise Mel-Frequency Cepstral Coefficients (MFCCs).

4. The method of claim 1, further comprising:
   determining one or more environmental attributes during each of the plurality of sequential windows;
   providing the one or more environmental attributes to the trained classifier with the plurality of features of the corresponding window.

5. The method of claim 4, wherein the environmental attributes comprises one or more of: temperature, positions, audio volume, vibration, and light level.

6. The method of claim 1, wherein each plurality of features comprise Mel-Frequency Cepstral Coefficients (MFCCs) and wherein providing each of the plurality of features to the trained artificial neural network comprises generating an image of the MFCCs.

7. The method of claim 1, wherein the speaker type is selected from: female, child, male, and non-human.

8. The method of claim 1, wherein the speech attribute comprises tone.

9. The method of claim 1, wherein the speech attribute comprises parentese.

10. The method of claim 1, wherein the user-perceivable output comprises a light, sounds, or vibration.

11. The method of claim 1, wherein providing the user-perceivable output comprises illuminating one of a plurality of lights according to whether the CTC exceeds a predetermined threshold.

12. The method of claim 1, wherein generating the conversational attribute comprises:
   identifying child speech in one of the plurality of sequential windows; and
   searching a predetermined number of prior windows for adult speech.

13. The method of claim 1, wherein the convolutional neural network includes exactly one convolutional layer.

14. The method of claim 1, wherein the convolutional neural network is quantized.

15. A device for providing real-time feedback of conversational attributes, the device comprising:
   a computing node configured to perform a method comprising:
      receiving an audio signal comprising speech;
      dividing the audio signal into a plurality of sequential windows;
      extracting a plurality of features from each sequential window of the audio signal;
      sequentially providing each plurality of features to a trained artificial neural network, in particular a convolutional neural network and receiving therefrom a speech attribute of the corresponding window of the audio signal, the speech attribute comprising a speaker type;
      after receiving each speech attribute, and based upon that speech attribute and speech attributes of prior windows, generating a conversational attribute, wherein the conversational attribute comprises a conversational turn count (CTC) based on a change in speech attribute among that speech attribute and speech attributes of prior windows; and
      providing a user-perceivable output indicative of the conversational attribute; and
   a microphone configured to produce the audio signal;
   a light, a speaker, or a vibration motor configured to produce the user-perceivable output.

16. A computer program product comprising a computer readable storage medium having program instructions embodied therewith, the program instructions executable by a processor to cause the processor to perform a method comprising:
   receiving an audio signal comprising speech;
   dividing the audio signal into a plurality of sequential windows;
   extracting a plurality of features from each sequential window of the audio signal;
   sequentially providing each plurality of features to a trained artificial neural network in particular a convolutional neural network, and receiving therefrom a speech attribute of the corresponding window of the audio signal, the speech attribute comprising a speaker type;
   after receiving each speech attribute, and based upon that speech attribute and speech attributes of prior windows, generating a conversational attribute, wherein the conversational attribute comprises a conversational turn count (CTC) based on a change in speech attribute among that speech attribute and speech attributes of prior windows; and providing a user-perceivable output indicative of the conversational attribute.

\* \* \* \* \*